(12) United States Patent
Dewald et al.

(10) Patent No.: US 10,288,891 B2
(45) Date of Patent: *May 14, 2019

(54) INTEGRATION ROD ASSEMBLIES FOR IMAGE PROJECTORS

(71) Applicant: DOLBY LABORATORIES LICENSING CORPORATION, San Francisco, CA (US)

(72) Inventors: Duane Scott Dewald, Plano, TX (US); Nathan Wainwright, Plano, TX (US); Douglas J. Gorny, Pacifica, CA (US); Martin J. Richards, Gig Harbor, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/540,994

(22) PCT Filed: Dec. 23, 2015

(86) PCT No.: PCT/IB2015/059965
§ 371 (c)(1),
(2) Date: Jun. 29, 2017

(87) PCT Pub. No.: WO2016/108160
PCT Pub. Date: Jul. 7, 2016

(65) Prior Publication Data
US 2017/0371168 A1 Dec. 28, 2017

Related U.S. Application Data (60) Provisional application No. 62/127,105, filed on Mar. 2, 2015, provisional application No. 62/127,105, filed
(Continued)

(51) Int. Cl.
*G03B 21/20* (2006.01)
*H04N 9/31* (2006.01)
(Continued)

(52) U.S. Cl.
CPC .......... *G02B 27/0994* (2013.01); *G02B 6/00* (2013.01); *G02B 19/0047* (2013.01);
(Continued)

(58) Field of Classification Search
CPC .... G03B 21/208; G03B 21/20; H04N 9/3152; H04N 9/315; G02B 27/0994
(Continued)

(56) References Cited

U.S. PATENT DOCUMENTS 6,139,156 A 10/2000 Okamori
6,205,271 B1 3/2001 Bowron
(Continued)

FOREIGN PATENT DOCUMENTS

EP 1870744 12/2007
WO 2013/102759 7/2013

*Primary Examiner* — Ryan D Howard (57) ABSTRACT

Integrating rod modules are disclosed comprising a plurality of single and/or solid integrating rods that are mated together by straps. Such modules tend to comprise a greater length than the single and/or solid integrating rods and provide good illumination to a modulator that light from a light source is transmitted through the integrating rod module. The straps may comprise a material (e.g., glass) that has substantially same or similar thermal characteristics as the integrating rods. The straps may be glued to the integrating rods by a glue having a substantially different (e.g., lower) index of refraction than the integrating rods, so as not to disturb the internal reflectance of the rods. The straps may be reinforced by braces that may allow the integrating rod module to be set within a projection display system at an angle substantially different from horizontal.

20 Claims, 12 Drawing Sheets

Related U.S. Application Data on Mar. 2, 2015, provisional application No. 62/099,071, filed on Dec. 31, 2014.

(51) Int. Cl.

| | | |
|---|---|---|
| *G02B 27/09* | (2006.01) | |
| *G02B 19/00* | (2006.01) | |
| *G02B 27/28* | (2006.01) | |
| *G02B 6/00* | (2006.01) | |
| *G03B 21/28* | (2006.01) | |
| *G03B 21/00* | (2006.01) | |

(52) U.S. Cl.
CPC ......... *G02B 27/283* (2013.01); *G03B 21/208* (2013.01); *H04N 9/3126* (2013.01); *H04N 9/3152* (2013.01); *G03B 21/008* (2013.01); *G03B 21/28* (2013.01)

(58) Field of Classification Search
USPC .................................................. 385/901, 133
See application file for complete search history.

(56) References Cited

U.S. PATENT DOCUMENTS

| | | | |
|---|---|---|---|
| 6,249,382 B1 | 6/2001 | Komatsuda | |
| 6,341,876 B1 | 1/2002 | Moss | |
| 6,398,421 B1 | 6/2002 | Hoffman | |
| 7,178,922 B2 | 2/2007 | Sekiguchi | |
| 7,184,213 B2 | 2/2007 | Dewald | |
| 7,252,393 B1 | 8/2007 | Ma | |
| 7,576,932 B2 | 8/2009 | Vandorpe | |
| 7,710,669 B2 | 5/2010 | Li | |
| 8,125,702 B2 | 2/2012 | Ward et al. | |
| 8,317,331 B2 | 11/2012 | Li | |
| 8,351,122 B2 | 1/2013 | Teijido | |
| 8,531,492 B2 | 9/2013 | Wallener | |
| 8,684,533 B2 | 4/2014 | Whitehead | |
| 8,890,905 B2 | 11/2014 | Kwong | |
| 9,135,864 B2 | 9/2015 | Shields | |
| 2003/0103731 A1 | 6/2003 | Gogte | |
| 2006/0029350 A1 | 2/2006 | Chung | |
| 2006/0132914 A1 | 6/2006 | Weiss | |
| 2007/0280623 A1 | 12/2007 | Tsou | |
| 2008/0112189 A1 | 5/2008 | Okuda | |
| 2009/0001228 A1* | 1/2009 | Liu | G03B 21/54 248/65 |
| 2011/0037956 A1 | 2/2011 | Lin | |
| 2011/0279749 A1 | 11/2011 | Erinjippurath | |
| 2012/0106126 A1 | 5/2012 | Nojima | |
| 2013/0215512 A1 | 8/2013 | Coggio | |
| 2014/0126223 A1 | 5/2014 | Macpherson | |
| 2014/0327710 A1 | 11/2014 | Xu | |
| 2017/0371167 A1* | 12/2017 | Dewald | G02B 27/0994 |

\* cited by examiner

INTEGRATION ROD ASSEMBLIES FOR IMAGE PROJECTORS

CROSS REFERENCE TO RELATED APPLICATIONS

This application claims priority to U.S. Patent Application No. 62/127,105, filed on Mar. 2, 2015 and U.S. Provisional Patent Application No. 62/099,071, filed on Dec. 31, 2014, each of which is hereby incorporated by reference in its entirety.

TECHNICAL FIELD

The present invention relates to projector systems and, particularly, to improved light conduits for laser-based image projection systems.

BACKGROUND

Projector systems are now being architected with improvements in dynamic range. Many of these types of improvements are in the area of laser projection systems. Some such laser projections systems may also comprise dual and multi-modulator projector display systems. It may be desirable to improve the performance of these improved image projection systems.

SUMMARY

Integrating rod modules are disclosed comprising a plurality of single and/or solid integrating rods that are mated together by straps. Such modules tend to comprise a greater length than the single and/or solid integrating rods and provide good illumination to a modulator that light from a light source is transmitted through the integrating rod module. The straps may comprise a material (e.g., glass) that has substantially same or similar thermal characteristics as the integrating rods. The straps may be glued to the integrating rods by a glue having a substantially different (e.g. lower) index of refraction than the integrating rods, so as not to disturb the internal reflectance of the rods. The straps may be reinforced by braces that may allow the integrating rod module to be set within a projection display system at an angle substantially different from horizontal.

In one embodiment, an integrating rod module is disclosed, comprising: a first integrating rod; a second integrating rod; a strap, said strap mechanically mated to the first integrating rod and the second integrating rod, such that the end of the first integrating rod is proximal to the end of the second integrating rod; and further wherein, the strap is glued to the first integrating rod and the second integrating rod.

In another embodiment, an image projection display system is disclosed, comprising: a light source; a modulator; an integration rod module, the integration rod module transmitting light from said light source to the modulator; and wherein the integration rod module further comprises: a first integrating rod; a second integrating rod; a strap, said strap mechanically mated to the first integrating rod and the second integrating rod, such that the end of the first integrating rod is proximal to the end of the second integrating rod; and further wherein, the strap is glued to the first integrating rod and the second integrating rod.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

As utilized herein, terms "component," "system," "interface," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers. A component may also be intended to refer to a communications-related entity, either hardware, software (e.g., in execution), and/or firmware and may further comprise sufficient wired or wireless hardware to affect communications.

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Introduction

In the field of projector and other display systems, it is desirable to improve both image rendering performance and system efficiency. Several embodiments of the present application describe systems, method and techniques to affect these improvements by employing light field modeling for dual, or multi-modulation display systems. In one embodiment, light source models are developed and used to advantageous effect. Camera pictures of displayed images of known input images may be evaluated to improve light models. In some embodiments, an iterative process may accumulate improvements. In some embodiments, these techniques may be used on moving images to make live adjustments to improve image rendering performance.

Dual modulation projector and display systems have been described in commonly-owned patents and patent applications, including:

(1) U.S. Pat. No. 8,125,702 to Ward et al., issued on Feb. 28, 2012 and entitled "SERIAL MODULATION DISPLAY HAVING BINARY LIGHT MODULATION STAGE";
(2) United States Patent Application 20130148037 to Whitehead et al., published on Jun. 13, 2013 and entitled "PROJECTION DISPLAYS";
(3) United States Patent Application 20110227900 to Wallener, published on Sep. 22, 2011 and entitled "CUSTOM PSFs USING CLUSTERED LIGHT SOURCES";
(4) United States Patent Application 20130106923 to Shields et al., published on May 2, 2013 and entitled "SYSTEMS AND METHODS FOR ACCURATELY REPRESENTING HIGH CONTRAST IMAGERY ON HIGH DYNAMIC RANGE DISPLAY SYSTEMS";
(5) United States Patent Application 20110279749 to Erinjippurath et al., published on Nov. 17, 2011 and entitled "HIGH DYNAMIC RANGE DISPLAYS USING FILTERLESS LCD(S) FOR INCREASING CONTRAST AND RESOLUTION" and
(6) United States Patent Application 20120133689 to Kwong, published on May 31, 2012 and entitled "REFLECTORS WITH SPATIALLY VARYING REFLECTANCE/ABSORPTION GRADIENTS FOR COLOR AND LUMINANCE COMPENSATION".
  all of which are hereby incorporated by reference in their entirety.

One Exemplary Physical Architecture

Figure 1:
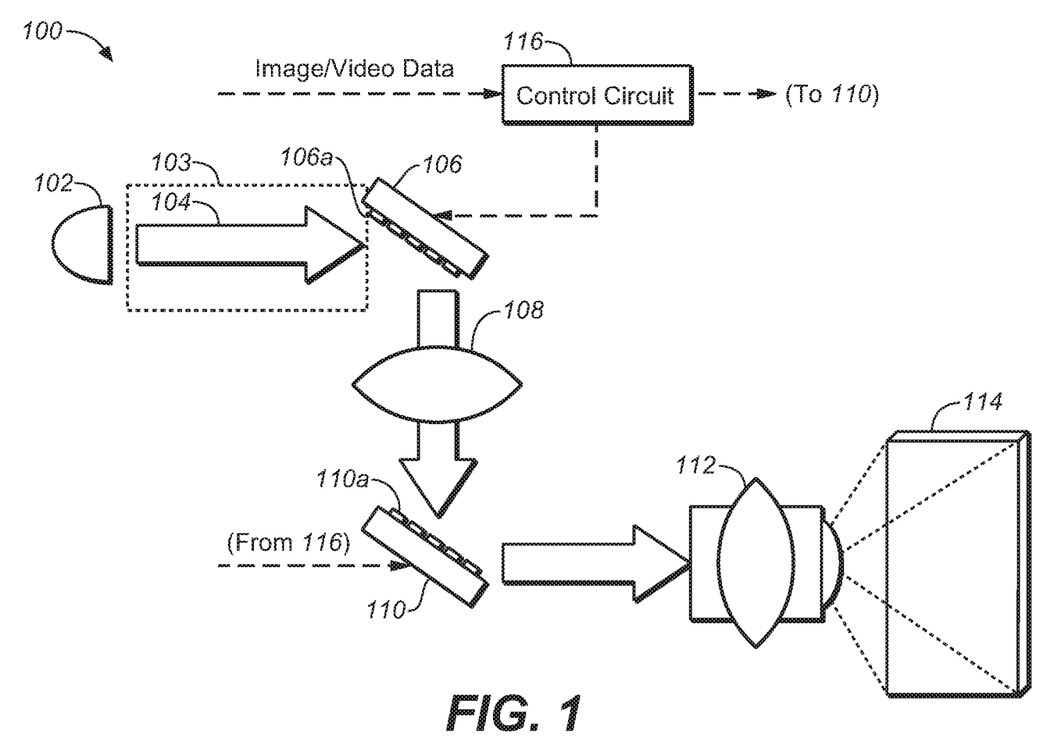
FIG. 1 depicts one schematic embodiment of an image projector display system as may be suitable for the improved integrating rod of the present application.

FIG. 1 shows one possible embodiment of a suitable image projector display system. In this embodiment, the projector display system is constructed as a dual/multi-modulator projector display system 100 that may suffice for the purposes of the present application. Projector system 100 employs a light source 102 that supplies the projector system with a desired illumination such that a final projected image will be sufficiently bright for the intended viewers of the projected image. Light source 102 may comprise any suitable light source possible—including, but not limited to: Xenon lamp, laser(s), coherent light source, partially coherent light sources. As the light source is a major draw of power and/or energy for the entire projector system, it may be desirable to advantageously use and/or re-use the light, so as to conserve the power and/or energy during the course of its operation.

Light 104 may illuminate a first modulator 106 that may, in turn, illuminate a second modulator 110, via a set of optional optical components 108. Light from second modulator 110 may be projected by a projection lens 112 (or other suitable optical components) to form a final projected image upon a screen 114. First and second modulators may be controlled by a controller 116—which may receive input image and/or video data. Controller 116 may perform certain image processing algorithms, gamut mapping algorithms or other such suitable processing upon the input image/video data and output control/data signals to first and second modulators in order to achieve a desired final projected image 114. In addition, in some projector systems, it may be possible, depending on the light source, to modulate light source 102 (control line not shown) in order to achieve additional control of the image quality of the final projected image.

Light recycling module 103 is depicted in FIG. 1 as a dotted box that may be placed in the light path from the light source 102 to the first modulator 106, as will be discussed below. While the present discussion will be given in the context of this positioning, it will be appreciated that light recycling may be inserted into the projector system at various points in the projector system. For example, light recycling may be placed between the first and second modulators. In addition, light recycling may be placed at more than one point in the optical path of the display system. While such embodiments may be more expensive due to an increase in the number of components, that increase may be balanced off against the energy cost savings as a result of multiple points of light recycling.

While the embodiment of FIG. 1 is presented in the context of a dual, multi-modulation projection system, it should be appreciated that the techniques and methods of the present application will find application in single modulation, or other dual, multi-modulation display systems. For example, a dual modulation display system comprising a backlight, a first modulator (e.g., LCD or the like), and a second modulator (e.g., LCD or the like) may employ suitable blurring optical components and image processing methods and techniques to affect the performance and efficiencies discussed herein in the context of the projection systems.

It should also be appreciated that—even though FIG. 1 depicts a two-stage or dual modulator display system—the methods and techniques of the present application may also find application in a display system with only one modulator or a display system with three or more modulator (multi-modulator) display systems. The scope of the present application encompasses these various alternative embodiments.

One Light Recycling Embodiment

Figure 2:
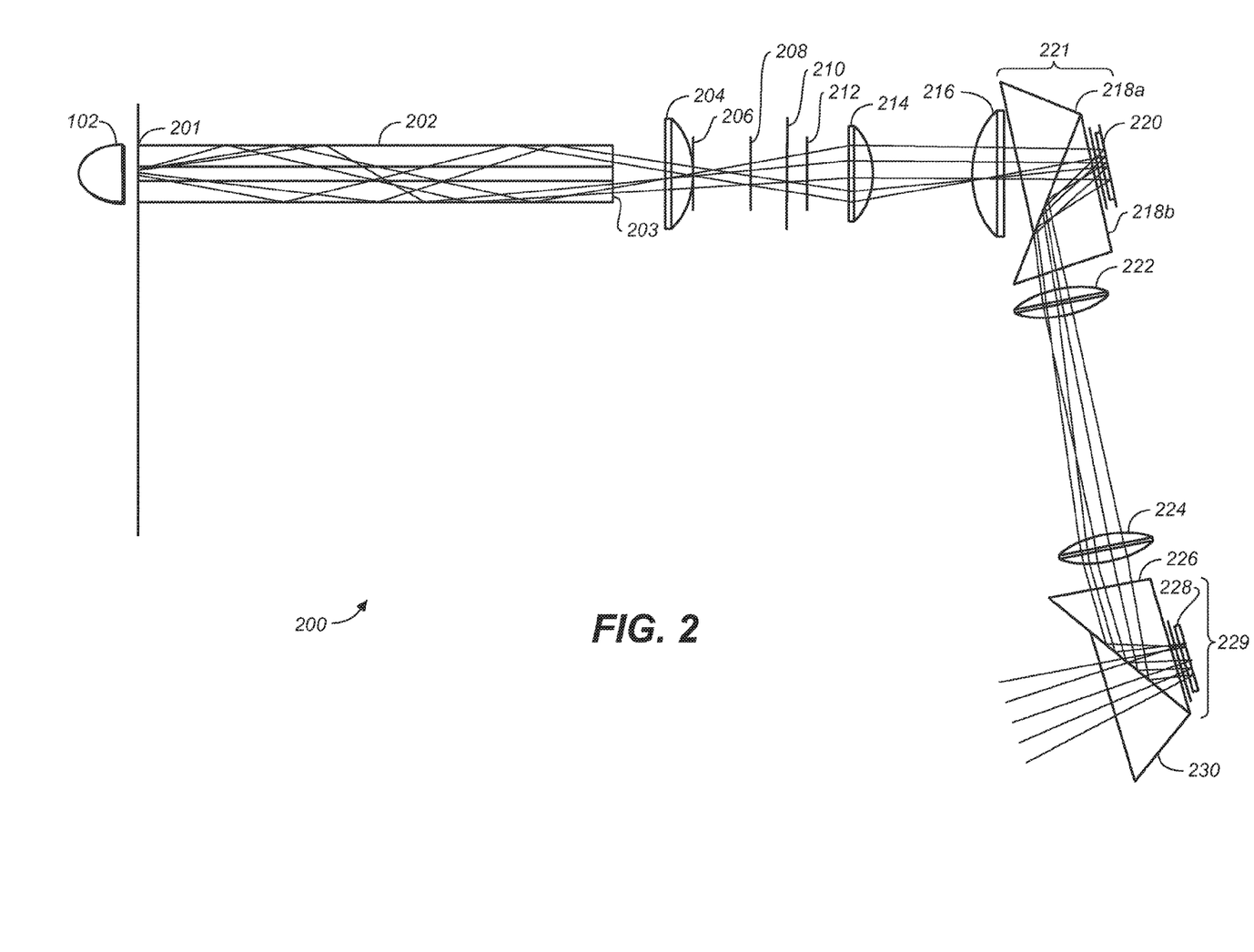
FIG. 2 depicts one embodiment of a light conduit module that suffices for the purposes of the present application.

FIG. 2 depicts one embodiment of a light conduit subsystem and/or module 200, as may be suitable for the purposes of the present application. As discussed above, this light conduit subsystem/module may be placed in the projector system primarily between the light source 102 and a first modulator 221. Light from light source 102 may be input to the optical path via an integrating rod/tube/box 202. In one embodiment, integrating rod/tube/box 202 may comprise a substantially reflected surface in its interior, so that light that is incident on its surface may be reflected (e.g., possibly multiple times) until the light exits its extreme right end 203. Once the light exits the integrating rod/tube/box, the light may be placed into an optical path that is defined by a set of optical elements—e.g., lens 204, 214 and 216 and a set of filters and/or polarizers 206, 208, 210 and 212. This embodiment may also be constructed to perform light recycling, if desired for the design of this projector system.

First modulator 221 may comprise a number of prisms 218a, 218b and a reflector 220. Reflector 220 may comprise a DMD array of reflectors, or a MEMS array—or any other suitable set of reflectors possible that may reflect light in at least two or more paths. One such path is depicted in FIG. 2. As may be seen, reflectors 220 direct the light onto the interface of prisms 218a and 218b, such that the light is thereby reflected into lens assembly 222 and thereafter to second modulator 229 (e.g., comprising lens assembly 224, prisms 226 and 230 and reflector 228). This light may be employed to form the finally projected image to be viewed by an audience.

However, at certain time during the rendering of the final projected image, the full power/energy of the light source 102 may not be needed. If it is not possible to module the power of light source 102 (or if it is difficult or if there is additional opportunity to conserve light), then it may be desired to recycle the light from light source 102. In this case, and as may be seen in FIG. 2, it may be possible to align reflector 220 from its current position as shown (i.e., where the light is directed to travel the path down to the second modulator—to position instead where the light would be substantially reflected back to the integrating rod/tube/box 202, along substantially the same path as described as traveling from right-to-left direction.

In another embodiment, a third (optional) path (not shown) allows the reflectors to direct light from the light source to a light "dump"—i.e., a portion of the projector system where the light is absorbed. In this case, the light is wasted as heat to be dissipated from the projector system. Thus, the projector system may have multiple degrees of freedom when it comes to directing the light as desired.

Figure 3:
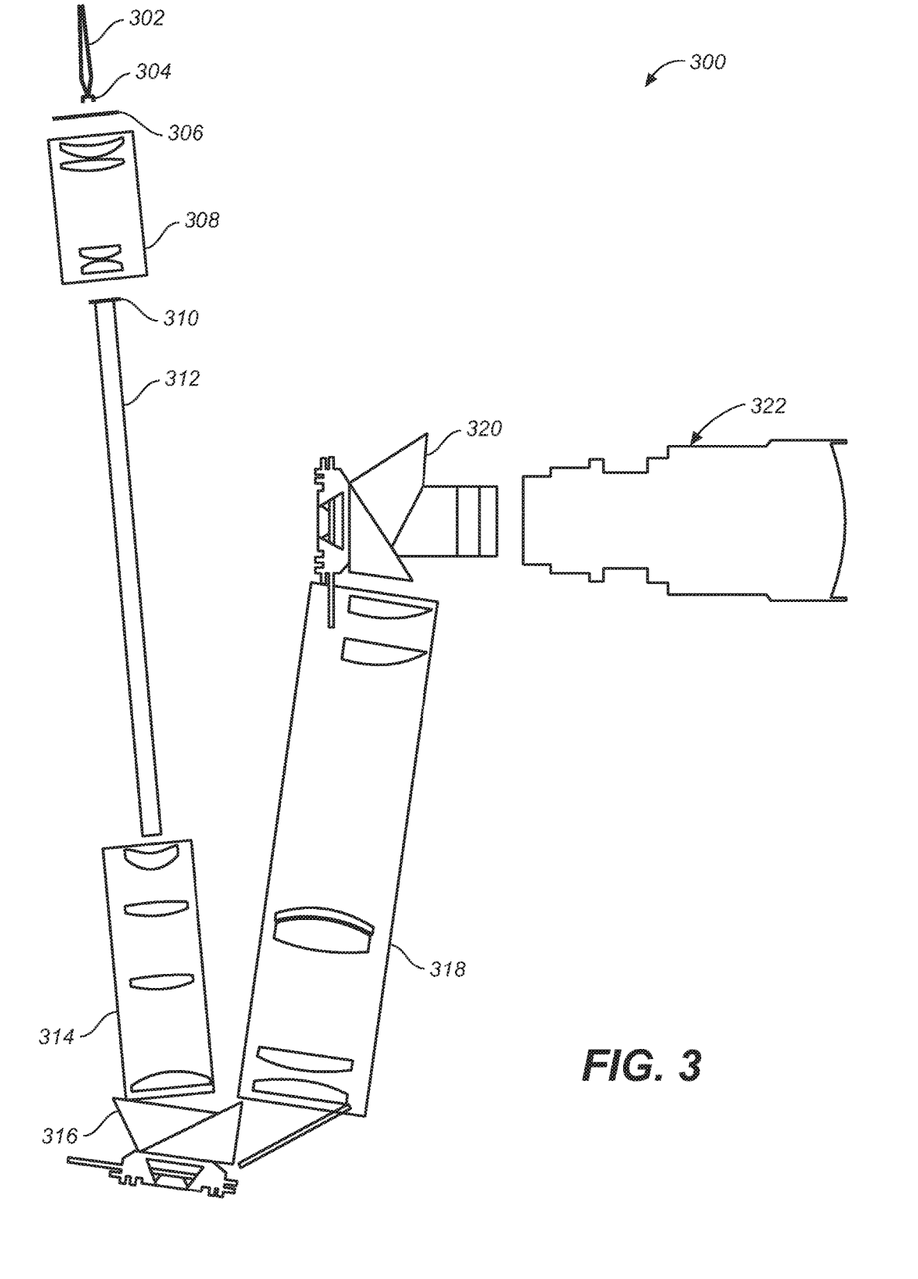
FIG. 3 depicts another embodiment of a light conduit module that may suffice for the purposes of the present application.

FIG. 3 is yet another embodiment of a light conduit module 300—which may serve to transmit light from at least one laser and/or partially coherent colored light source and ports (e.g., through fiber launch 302, collimator 304, diffuser 306). Light from such a source may transmit through a first optical subsystem/diffuser relay 308 to condition the light to be input into integrating rod 312—which may comprise the reflecting proximal end 310 (e.g., recycling mirror), such as in FIG. 3. A second optical subsystem/recycling relay 314 may further condition the light as desired prior to input into a first modulator 316. As with FIG. 2 above, this first leg of the module 300 may affect a light recycling mode, as discussed.

After first modulation, light may be transmitted through a third optical subsystem/PSF relay 318 prior to input into a second modulator 320—which modulates the light for transmission through a projector optical subsystem 322 to project a final image for viewing. continued reference to FIG. 3, there is shown a relay optical system 318 that is placed in between a first modulator 316 (e.g., a pre-modulator) and a second modulator 320 (e.g., a primary modulator/nine piece prism). Such a relay optical system may be desirable to both reduce the amount of artifacts in the image processing—as well as increasing the contrast of the projected image.

As discussed herein in the context of one embodiment, it may be desirable for the first modulator/pre-modulator to produce a blurred and/or de-focused image based upon image data values, such as the halftone image mentioned herein. In many embodiments, it may be desirable to have a relay optical system that tends to produce a uniformly blurred/de-focused image from the pre-modulator to the primary modulator. In addition, it may be desirable to have a desired, defocused spot shape for this embodiment.

In many embodiments, the relay optical system may comprise lenses or other optical elements that effectively moves the focal plane, corrects for any coma, and adjusts the spread (e.g., by creating defocus/blur and adding spherical aberration to some desired amount).

Other Projector System Embodiments

Figure 4:
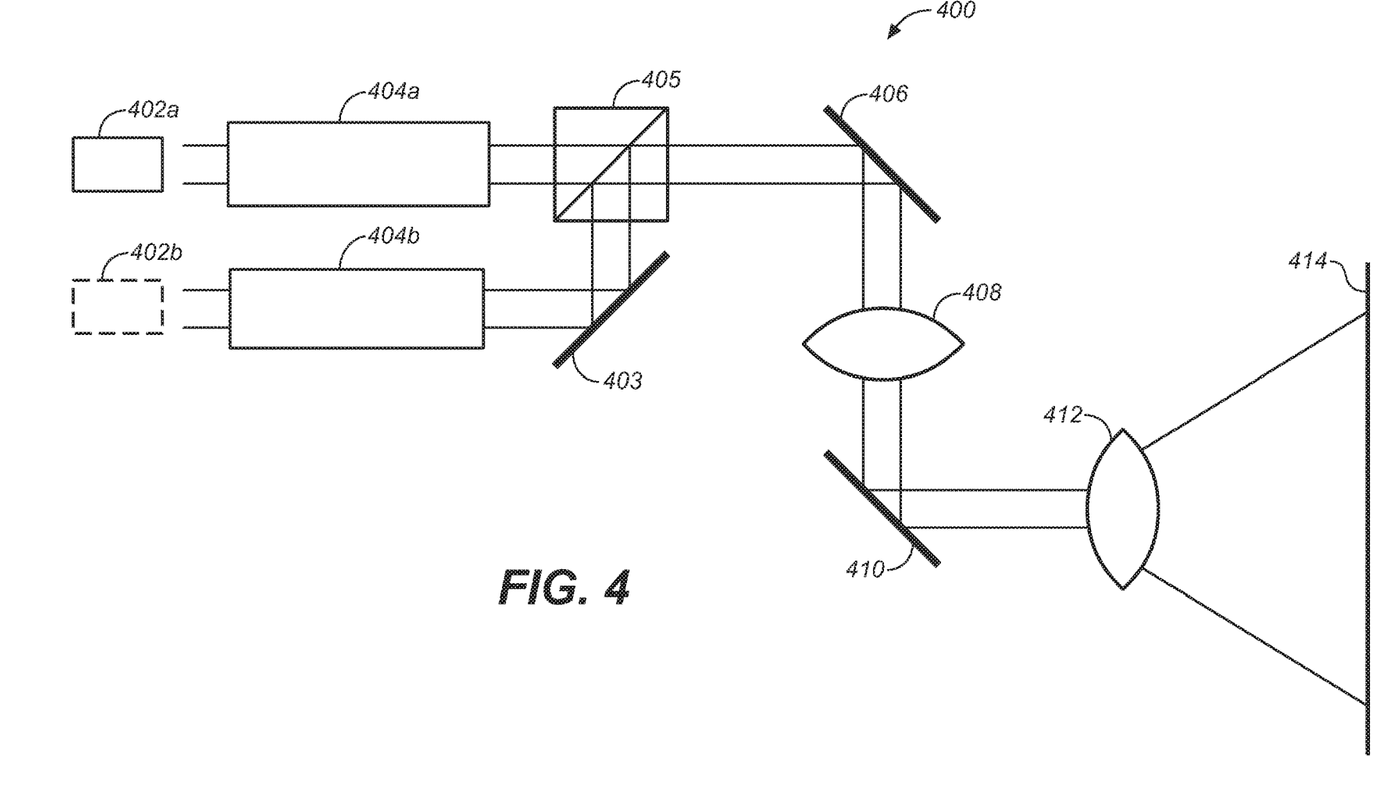
FIG. 4 depicts another embodiment of a dual/multi-modulator projector system where it may be possible and/or desirable to perform light recycling in accordance with the principles of the present application.

FIG. 4 depicts another embodiment of a dual/multi-modulator projector system 400 where it may be possible and/or desirable to perform light recycling. As may be seen, projector system 400 may comprise one or more light sources (e.g., 402a and/or 402b, or other additional light sources). In this embodiment, the light source 402a provides light into an integrated subsystem/box 404a that may resemble the embodiment of FIG. 2. Light from 402a may eventually make it to first modulator 406—where first modulator 406 may be constructed in substantially the same way as FIG. 1 and/or FIG. 2 (i.e., with reflectors that may reflect the light back into integrating subsystem/box 404a. The light may then proceed to optical subsystem 408, second modulator 410 and thereafter to projector lens 412 and a final projected image may be formed on screen 414.

However, another opportunity for light recycling may occur with another one (or more, in other embodiments) light source 402b. In one embodiment, light source 402b may be employed as another primary light source (i.e. to provide a significant amount of light for final images a substantial amount of the time). In this embodiment, light from 402b may be further reflected by reflector 403 such that this light may be combined with the light from 402a at beam splitter 405—and the combined beam forms the final image a substantial amount of the time.

In another embodiment, light source 402b may be used a lesser amount of the time in order to provide highlight illumination within part of the image. It should be appreciated that reflector 403 may be a single mirror that is possible moveable (e.g. to take light to a dump or another recycling subsystem). Alternatively, reflector 403 may be a set and/or an array of reflectors (e.g., MEMS, DMD or the like) to provide a finer control of the additional light from 402b.

In yet another embodiment, light source 402b may be optional and integrating subsystem/box 404b may have a fully reflective surface at the end proximal to where light source 402b might be. In this embodiment, light may have another path (e.g. inside box 404b, as well as box 404a) in which to recycle light. In another embodiment, it might be possible to use a one way mirror for 405. In this case, reflector 403 would just be a controllable mirror that may redirect the light into 404b and, thus, reflector 403 may only be necessary to "fold" the system for recycling. In such an embodiment, there may be no need to have light recycled in 404a but instead light may be recycled in 404. This may be desirable as the recycling reflector which may not have hole in it for the light input making it a much more efficient recycler.

Figure 5:
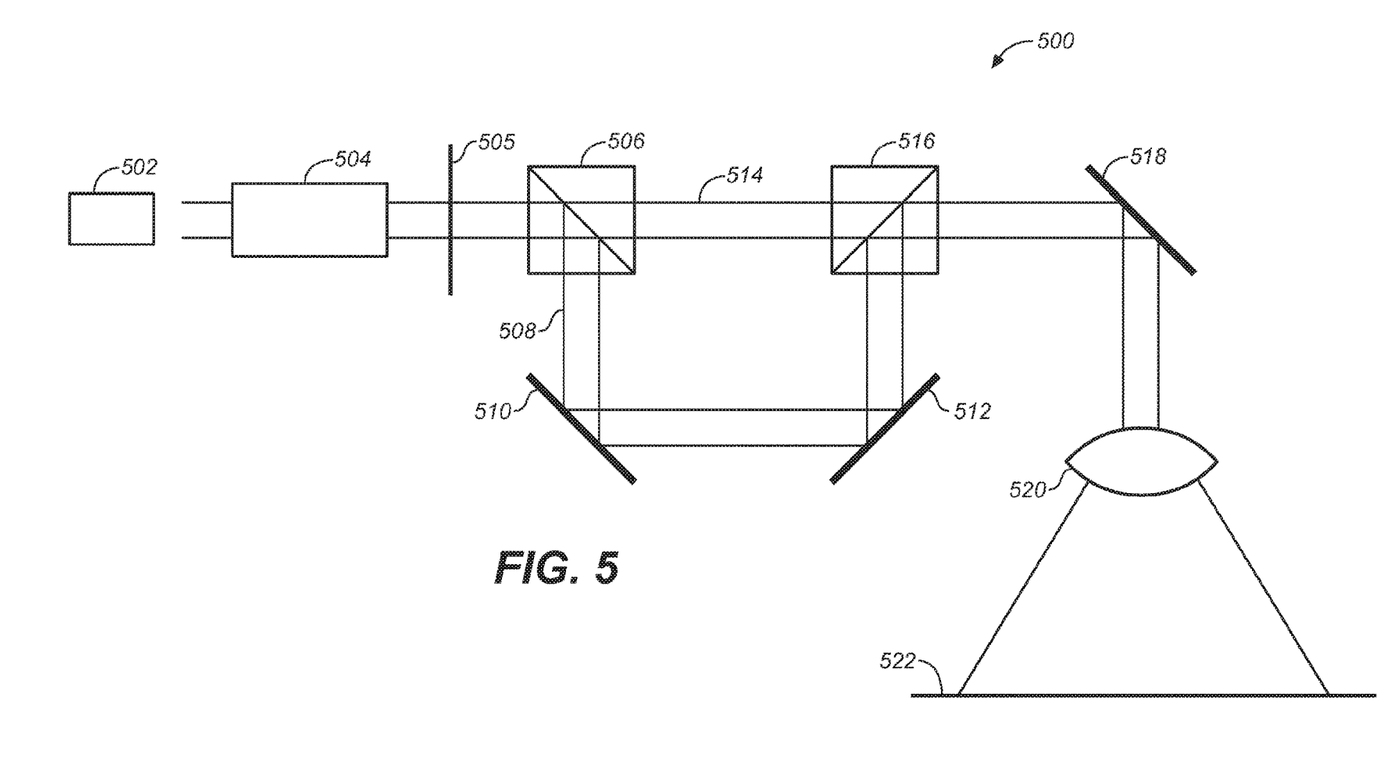
FIG. 5 depicts yet another embodiment of a projector system where light recycling may be possible and/or desirable in accordance with the principles of the present application.

FIG. 5 is yet another embodiment for which light recycling may be possible and/or desirable. Projector system 500 may comprise a light source 502 and integrating subsystem/box 504 as previously described. Polarizer 505 may be a controllable polarizer such as an LCD which will polarize a selectable portion of the light in one orientation. Beam splitter 506 may be a polarizing beam splitter which will let the light in one orientation pass straight through as uniform light field 514 to get combined using 516 onto primary modulator 518. The light polarized in the other orientation gets redirected by 506 as 508. Mirror 510 may be a mirror to fold the system and get light to either a pre-modulator or a highlights modulator 512, depending on the design of the system.

The non-uniform light field from 512 then gets combined with 514 using 516 to illuminate 518. When 512 is a pre modulator, beam 514 may be used to provide some base level of illumination less than the first step of 512 out of dark for very dark portions of the image 522. Alternatively, when 512 is a highlight modulator, 514 is used to provide the uniform light level required by image 522 in regions where no light will be in the non-uniform light field created by 512.

In other embodiments, it may be possible to place a recycling-type integrating rod (similar to those described in FIG. 3) in between 510 and 512 (or in between 506 and 510) and a non-recycling version of an integrating rod (e.g., without a back reflector) in between 506 and 516. In such an embodiment, it may be desired to remove 504 after 502 in order to keep the light as a tight beam.

Improved Integrating Rod Embodiment

As discussed above, it may be desirable to improve the efficiency of these projector systems, both in terms of energy efficiency and/or in terms of cost efficiency.

One such improvement may be made in the integrating rod. It may be desirable to increase the length of the integrating rods placed in the optical path of the projector system—e.g., to improve the uniformity of the image. To increase the length of the integrating rod, it may be possible to place and affix a plurality of conventional integrating rods together in a fashion that the performance of the final lengthened integrating rod performs well.

As discussed further herein, such improved integrating rods may be oriented in a number of potential different orientations within a given projector system. Such different orientations may not be practical with standard, solid integration rods due to weak retention methods. Hollow rods might be used, but may not be practical due to power handling limitations and light reflection losses. Thus, many present embodiments may tend to combine the robust mounting option of a hollow rod with the efficiency of a solid rod. In some embodiments, straps may be solidly mechanically restrained without interfering with the light path. Such straps may also be applied to more standard integration rods but allow robust mounting. The straps may also reinforce the structural integrity of multiple rod assemblies which are butt joined to create longer integration length and/or which are joined length wise to combine multiple small integration rods. In some embodiments, the small cross sectional area rods may create more bounces down the length vs a single larger cross section integration rods. The bond line thickness and index of glue may be critical to not disturbing the Total Internal Reflectance (TIR) of the integration rod. In some embodiments, these improvements may not be limited to laser illumination alone, but the high f/# of a laser system may tend to ease the requirement for critical angle achieved by the bond line thickness and glue index.

Figure 6:
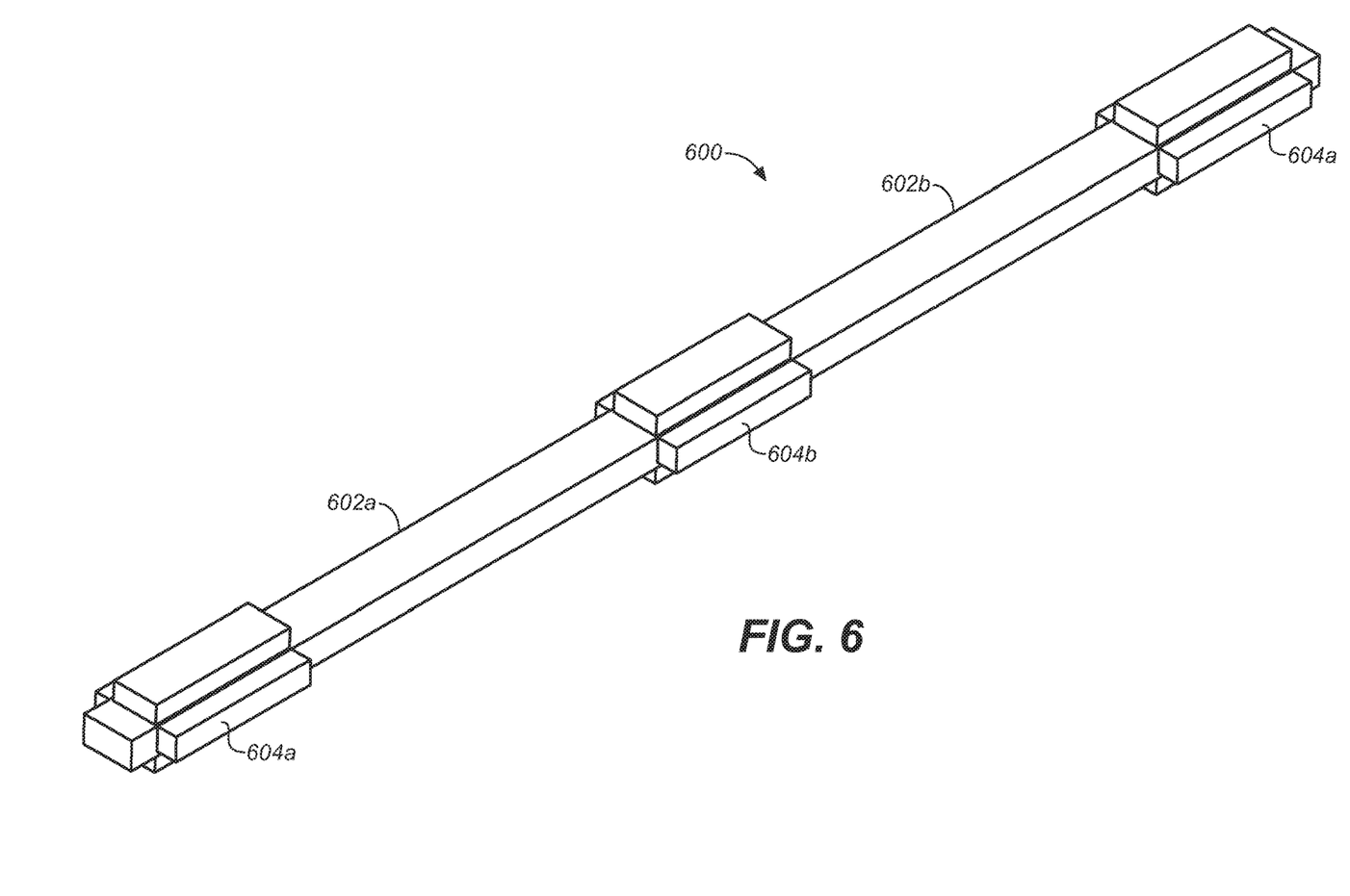
FIG. 6 depicts one embodiment of an improved integrating rod 600 as made in accordance with the principles of the present application.

FIG. 6 depicts one embodiment of an improved integrating rod module 600 as made in accordance with the principles of the present application. Integrating rod 600 may comprise a plurality of smaller individual integrating rods—e.g., 602a and 602b—that are held together by one or more joining sections (aka "straps")—e.g., 604a, 605b and 604c.

It should be appreciated that the number of integrating rods may be more than two, as desired for the final design of the projector system. Integrating rod 600 may be employed in the various embodiments mentioned herein (e.g., at 312 in FIG. 3, 202 in FIG. 2—or in other projector display systems, such as single modulation systems or multi-modulation systems).

Figure 7A:
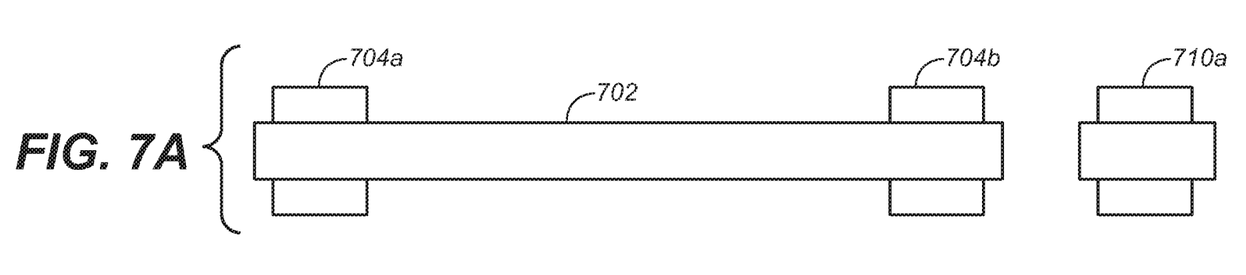
FIGS. 7A, 7B and 7C depict various embodiments of improved integrating rods as made in accordance with the principles of the present application.
Figure 7B:
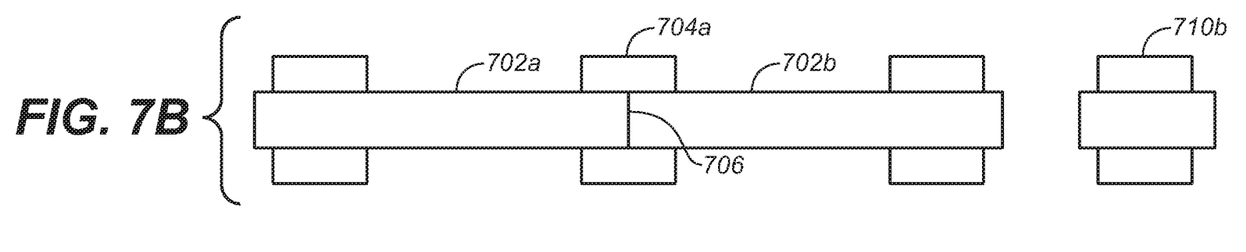
Figure 7C:
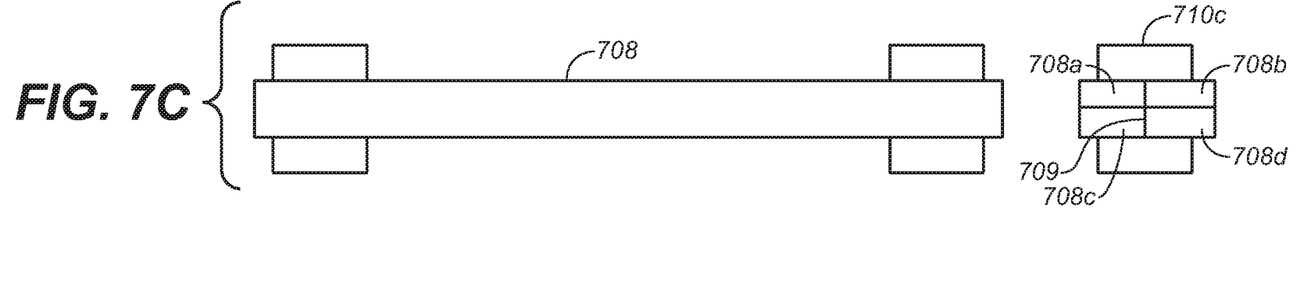

FIGS. 7A, 7B and 7C depict various integrating rods and their construction. In FIG. 7A, a single integrating rod 702 is shown being placed between two straps 704a and 704b. In FIG. 7B, two single integrating rods 702a and 702b are shown being joined together by strap 704a. As these two integrating rods are in optical communication with each other, the interface 706 provides such optical communication, as is discussed further herein. FIG. 7C depicts yet another embodiment wherein a plurality of small cross-section rods (e.g. 708a, 708b, 708c and 708d) are joined together to form a larger integrating rod 708. Strap 710 is shown, providing mechanical stability and aiding optical communication between the various sections of the rods and at the interface 706. Such interfaces may be glue bonded faces that create a substantially seamless bond. Alternatively, such interfaces may be accomplished through optical contacting.

The improved integrating rods shown herein have a cumulative greater length than a single, conventional integrating rod. For example, lengthened integrating rods may have a variety of lengths—e.g., from 150 mm long to 450 mm long or longer, as desired. This may be desirable in order to provide an appropriate f-number for the optical system—e.g., to provide for a desired number of light bounces in the rod for good uniform illumination of the modulator distal to the integrating rod. For merely one example (and in reference to FIG. 3), some exemplary f-numbers may be F/5 for the diffuser relay 308, F/2.5 for the integrating rods 312, F/3.8 for the primary modulator 316 and F/4/5 for the second modulator 320.

In some cases, the improved integrating rods constructed from mating/cementing together multiple rods (instead of making one long rod) may be desirable from the standpoint of ease of manufacturing and cost. In addition, using longer rods (however constructed) may be desirable when used for laser illumination because lasers allow a high f/#—which makes better contrast and transmission—and the longer rods may tend to achieve sufficient uniformity.

During manufacturing, single longer rods may not fit in conventional vacuum chambers used to coat the end faces of the integration rods. This coating is required for throughput and recycling efficiency. Custom chambers could be made to handle the longer rods, but may use a larger capital investment at $3^{rd}$ party supplier. Thus, manufacturing with multiple rods to make a longer rod, (e.g., limiting the rod size to standard sizes) may tend to allow the supplier to process the rods through normal methods for blocking, polishing, and coating. The additional combination step at the end tends to fit in with methods that are used to assemble prisms.

Additional Embodiments

In the figures of FIGS. 6, 7A-7C, there are shown straps that used to provide mechanical mating/bonding/attaching/communication/stability or the like for the improved, lengthened integrating rod as discussed.

Straps may comprise material that are commonly known in the art—e.g. stainless steel, other metals or the like. In one embodiment, the straps may comprise glass and/or some other suitable material that may be a reasonable match of the thermal expansion property/behavior of the material comprising the integrating rod and/or portions thereof. For example, integrating rods may comprise glass or some other suitable transmissive/transparent material. In the context of a laser light (or some other high power light source) image projector system, the integrating rods may inhabit an environment of thermal extremes—and, as such, it may be desirable to have the straps comprising material (e.g., glass, fused silica, or the like) that may match the thermal expansions that the integrating rods may undergo.

Figure 8:
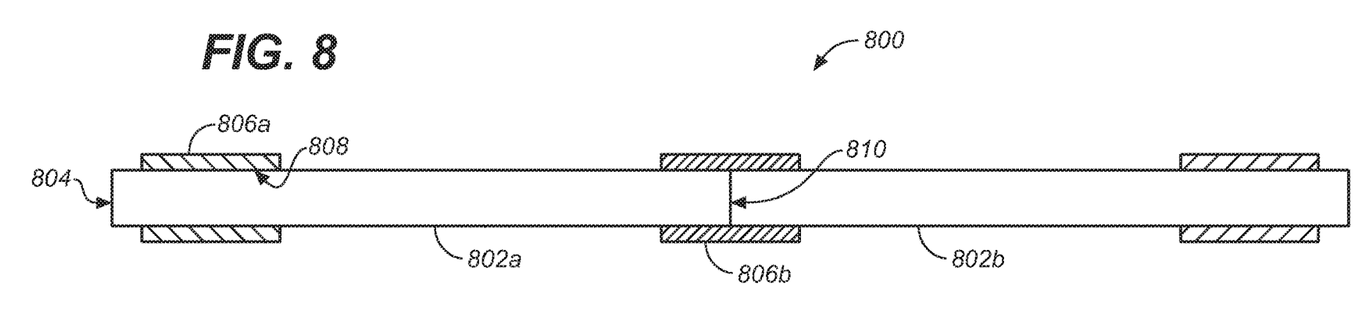
FIG. 8 depicts one embodiment of the mechanical mating of a plurality of integrating rods.

FIG. 8 depicts one embodiment of the mechanical mating (800) of a plurality of integrating rods (802a, 802b). At the proximal end 804 of the first integrating rod, there may be an anti-reflective (AR) coating applied, as shown. At straps 806a and 806b, a glue may be applied substantially along the length of the strap/rod interface 808. It may be desirable for this glue to be a mismatch of the index of refraction of the glass of the integrating rod (e.g., it may have a low index—as may be found in commercially available NOA133 adhesive, supplied by Norland Products, Inc.). This mismatch would tend not to disturb the total internal reflection supplied by the integrating rod. If there were such a disturbance, then light loss and other undesirable effects/errors may be introduced into the optical system. The low index adhesive changes the TIR angle relative to air, but with the high f/# of lasers, it tends to produce acceptable results.

Figure 9:
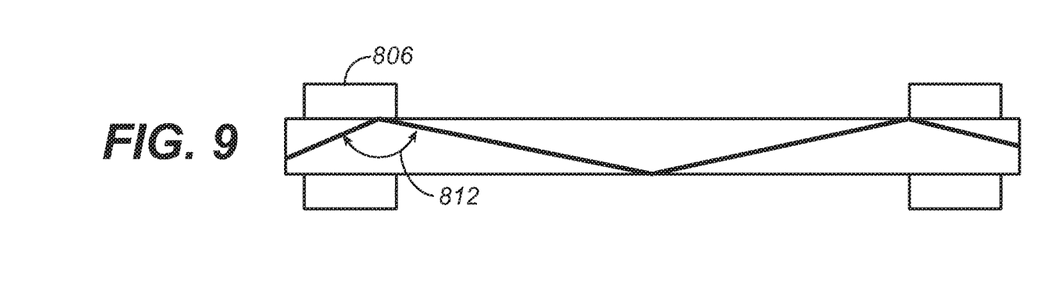
FIG. 9 depicts that the mechanical mating at the straps should not substantially disturb the critical angle and allow internal reflection to proceed without substantial loss.

At strap 806b, it may be seen that two integrating rods are mated in place to maintain optical integrity. At the interface 810, another (e.g., different) glue may be applied to aid in the mechanical integrity/stability of the optical system. In some embodiments, the glue may be selected to have a substantial match with the index of refraction with the material comprising the integrating rods. FIG. 9 depicts that the mechanical mating at the straps (806) should not substantially disturb the critical angle (812)—and allow the internal reflection to proceed without substantial loss.

Figure 10A:
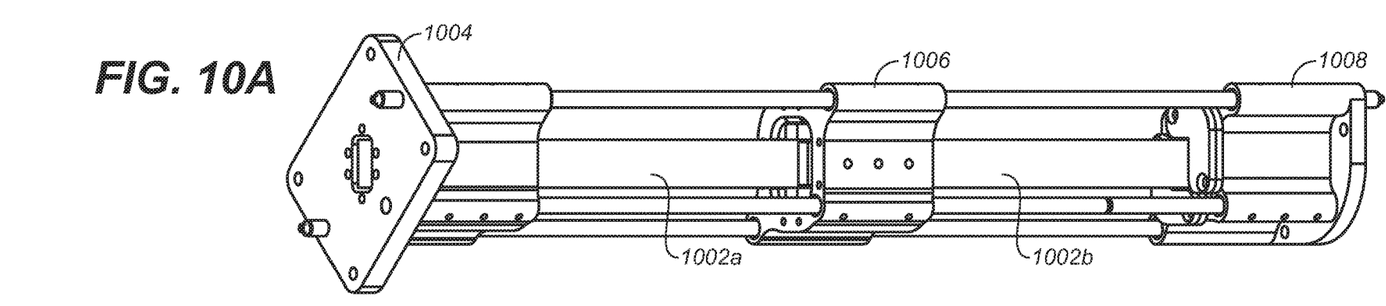
FIGS. 10A, 10B and 10C depicts various perspectives of a set of braces that mechanically mate the integrating rod module to a projection display system.
Figure 10B:
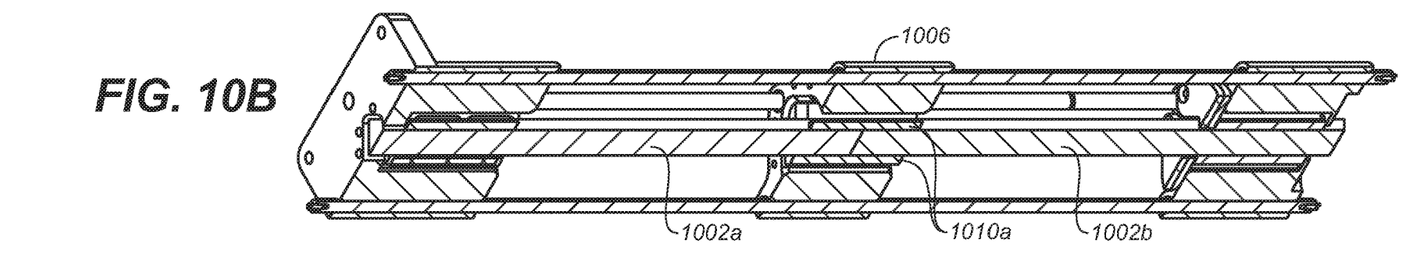
Figure 10C:
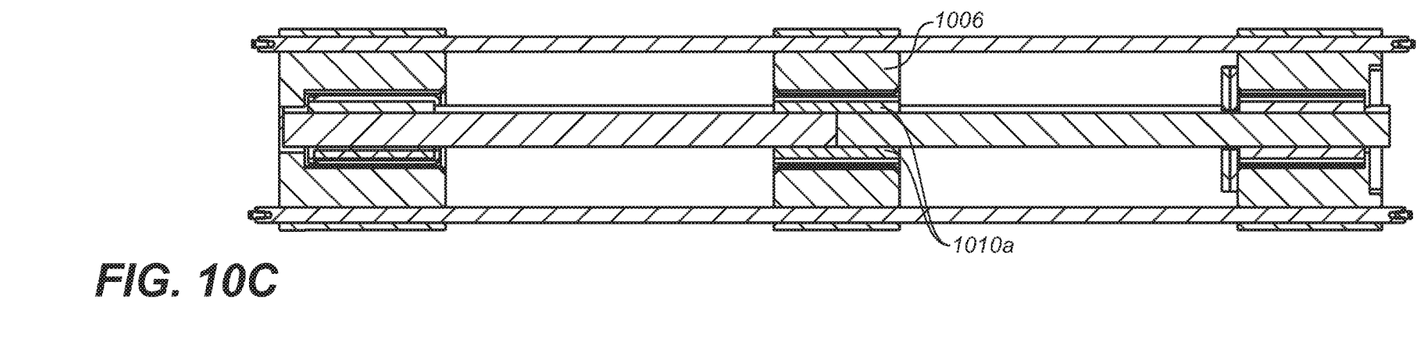

FIGS. 10A, 10B and 10C gives a perspective view, a perspective cut-view and a front, cut-view of one embodiment of additional mechanical supports for the improved integrating rod As seen in these figures, integrating rods 1002a and 1002b may be mechanically mated by straps 1006, as discussed herein. These straps and the integrating rods may be held further in place within the projector systems with a set of brackets/braces 1004, 1006 and 1008—that may give further mechanical mating to the rest of the projector system.

As a result of the improved mating of the integrating rods to straps (and, possibly, also straps to braces and brackets), the orientation of the integrating rod may be held at substantially different angles than horizontal. This may tend to give significant design options for constructing the projector systems.

Other Embodiments

As mentioned above, gluing the integrating rods to the straps may tend to give good mechanical stability to the integrating rods and allow them to be placed within a number of different orientations. As also mentioned, it may be desirable to apply a glue with an index of refraction mismatch with the material comprising the integration rods.

Figure 11:
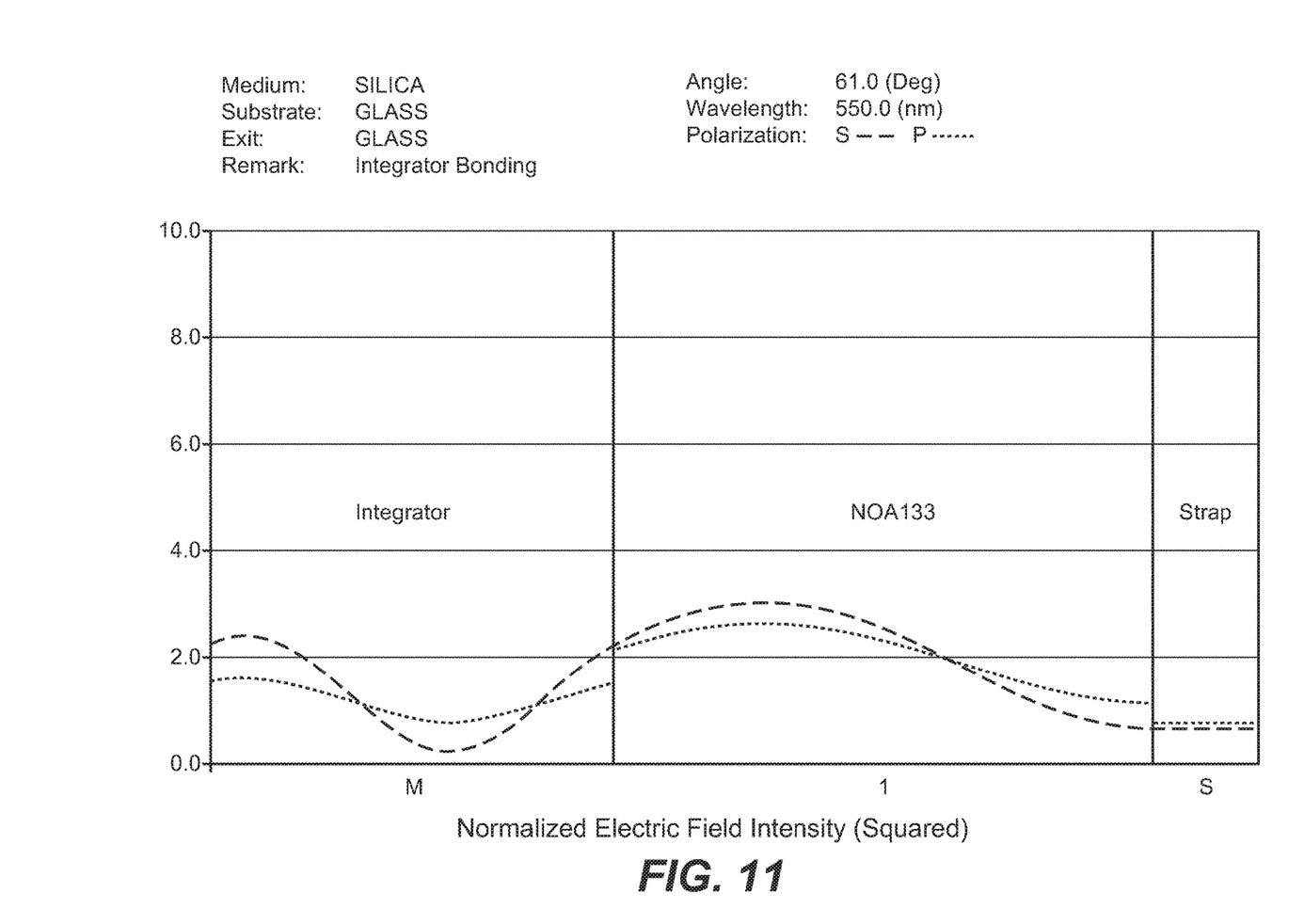
FIGS. 11, 12 and 13 depict three plots that purport to show the performance characteristics of the rod/glue/strap interface that varies according to the thickness of the layer of the glue.
Figure 12:
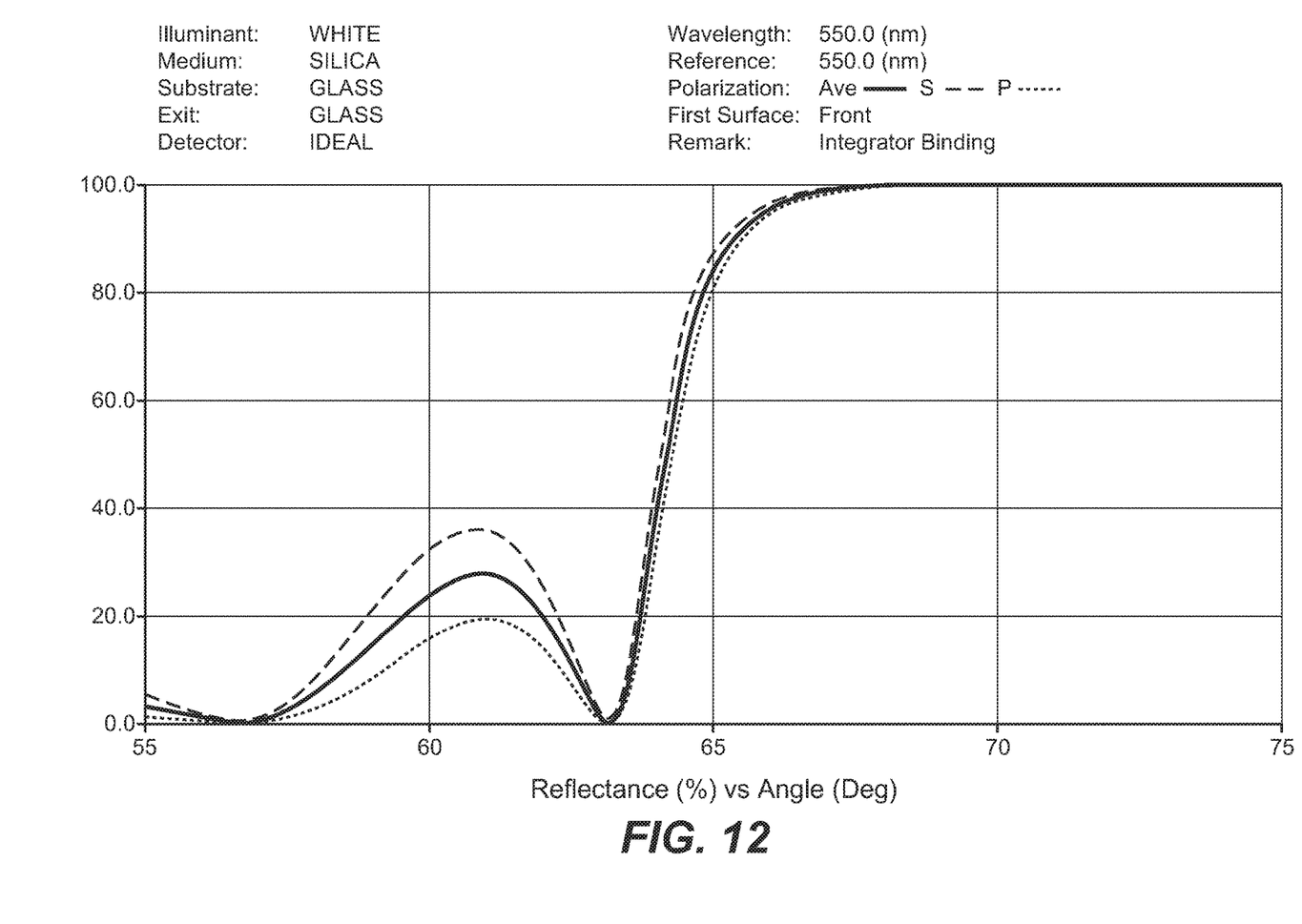
Figure 13:
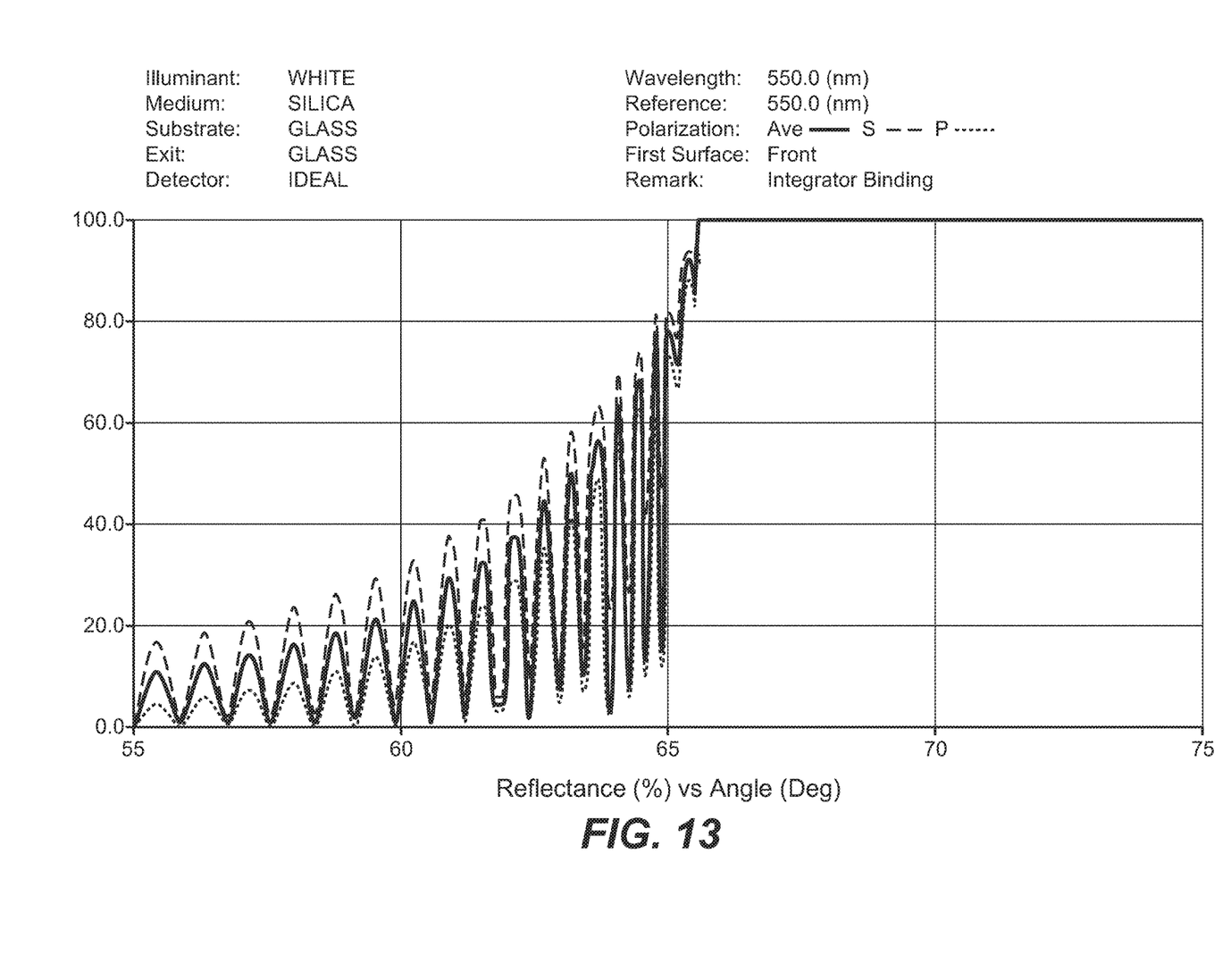

Another consideration for such bonding is the amount and/or thickness of this glue layer applied to the straps. FIGS. 11, 12 and 13 give plots depicting the potential performance of the glue when applied in different thicknesses. FIG. 11, for example, purports to show the possible electric field intensity and various polarizations through the rod, the glue (e.g. NOA 133) layer and into the strap—for a layer of glue of thickness about 0.5 microns. As may be seen, the electric field may pass substantially through the glue at this level of thickness—which may not be desirable.

FIGS. 12 and 13 depict the possible reflectance vs. angle performance for thicknesses of glue of about 1 micron and 10 microns, respectively. As may be seen, for about 1 micron, there may be a substantial amount of light less than the critical angle may be transmitted through the glue/adhesive. For about 10 microns, there may be areas of constructive and destructive interference that may be formed within the glue/adhesive layer. Overall, the thickness of the glue should be several multiples thicker than the wavelength of light being transmitted.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. An integrating rod module, comprising:
a first integrating rod;
a second integrating rod;
a strap, said strap mechanically mated to the first integrating rod and the second integrating rod, such that the end of the first integrating rod is proximal to the end of the second integrating rod; and
further wherein, the strap is glued to the first integrating rod and the second integrating rod.

2. The integrating rod module of claim 1 wherein further the strap comprises a material having substantially the same thermal expansion property of the first integrating rod.

3. The integrating rod module of claim 2 wherein further the strap comprises glass.

4. The integrating rod module of claim 3 wherein further the strap is glued to the first integrating rod and the second integrating rod with a first glue.

5. The integrating rod module of claim 4 wherein further the first glue mating the strap to the first integrating rod and the second integrating rod comprises a first glue that has substantially a different index of refraction from the material comprising the integrating rods.

6. The integrating rod module of claim 5 wherein the first glue does not substantially disturb the internal reflectance of the first integrating rod.

7. The integrating rod module of claim 6 wherein the first glue comprises a thickness of greater than several multiples the wavelength of the light transmitted through the integrating rod.

8. The integrating rod module of claim 1 wherein the end of the first integrating rod is glued to the end of the second integrating rod with a second glue.

9. The integrating rod module of claim 8 wherein the second glue comprises an index of refraction substantially the same as the material comprising the first integration rod.

10. The integrating rod module of claim 1 wherein the module further comprises:
a brace, the brace mated to the strap and the brace further mated to a projector display system.

11. The integrating rod module of claim 10, wherein the brace is mated to the projector display system in such a manner as to orient the integrating rod module at an angle substantially different from horizontal.

12. The integrating rod module of claim 1 wherein the length of the integrating rod module substantially allows more than one bounce of the light transmitted through the integrating rod module.

13. The integrating rod module of claim 12 wherein the length of the integrating rod module substantially provides substantially uniform illumination to a first modulator.

14. A image projection display system, comprising:
a light source;
a modulator;
an integration rod module, the integration rod module transmitting light from said light source to the modulator; and
wherein the integration rod module further comprises:
a first integrating rod;
a second integrating rod;
a strap, said strap mechanically mated to the first integrating rod and the second integrating rod, such that the end of the first integrating rod is proximal to the end of the second integrating rod; and
further wherein, the strap is glued to the first integrating rod and the second integrating rod.

15. The image projection display system of claim 14 where further the integration rod module further comprises a brace, the brace mated to the strap and the brace further mated to the projector display system.

16. The image projection display system of claim 15 wherein the brace is mated to the projector display system in such a manner as to orient the integrating rod module at an angle substantially different from horizontal.

17. The image projection display system of claim 15, further comprising optical glue between at least two components being several multiples thicker than the wavelength of light being transmitted through the optical components.

18. The image projection display of claim 15, wherein the mechanically mated straps match a thermal expansion property of the integrating rods.

19. The image projection display of claim 15, further comprising a second modulator in an optical patch extending from the first modulator to the second modulator, and wherein the projection display comprises light recycling between the first modulator and the second modulator.

20. The image projection display according to claim 19, wherein the optical path comprises a projection that includes highlight illumination within part of the image to be displayed.

* * * * *